(12) United States Patent
Rhee et al.

(10) Patent No.: US 8,060,030 B2
(45) Date of Patent: Nov. 15, 2011

(54) PORTABLE TERMINAL HAVING OPTICAL TRANSMITTER/RECEIVER

(75) Inventors: Do-Young Rhee, Yongin-si (KR); In-Kuk Yun, Suwon-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 865 days.

(21) Appl. No.: 12/013,593

(22) Filed: Jan. 14, 2008

(65) Prior Publication Data

US 2008/0171581 A1   Jul. 17, 2008

(30) Foreign Application Priority Data

Jan. 16, 2007 (KR) .................. 10-2007-0004762

(51) Int. Cl.
*H04B 1/38* (2006.01)
(52) U.S. Cl. ............. 455/90.3; 455/575.1; 455/575.4; 455/575.3; 379/428.01; 379/440
(58) Field of Classification Search ............ 455/90.3, 455/575.1
See application file for complete search history.

(56) References Cited

U.S. PATENT DOCUMENTS

| 7,162,209 B2 * | 1/2007 | Ono ........................ 455/90.3 |
| 2003/0194975 A1 * | 10/2003 | Nishiyama et al. ........ 455/90.3 |
| 2003/0199290 A1 * | 10/2003 | Viertola ................ 455/575.1 |
| 2008/0013896 A1 * | 1/2008 | Salzberg et al. ............ 385/89 |

FOREIGN PATENT DOCUMENTS

| KR | 2004-46657 | 6/2004 |
| KR | 2006-34892 | 4/2006 |

* cited by examiner

*Primary Examiner* — Lester Kincaid
*Assistant Examiner* — Isaak R Jama
(74) *Attorney, Agent, or Firm* — Cha & Reiter, LLC

(57) ABSTRACT

In a folder type or a swing type terminal including a pair of housings or triple housings for attaining composite opening/closing operation, information transmission with a higher speed and larger capacity is available using optical devices for establishing communication lines between circuit devices in the housings. Also, a stable maintenance of the communication lines is possible between the circuit devices of the housings in spite of repeated opening/closing operation of the housings.

10 Claims, 9 Drawing Sheets

PORTABLE TERMINAL HAVING OPTICAL TRANSMITTER/RECEIVER

CLAIM OF PRIORITY

This application claims the benefit under 35 U.S.C. §119 (a) of an application entitled "Portable Terminal With Optical Transmitting/Receiving Portion", filed in the Korean Intellectual Property Office on Jan. 16, 2007 and assigned Serial No. 2007-4762, the contents of which are hereby incorporated by reference.

BACKGROUND OF THE INVENTION

1. Field of the Invention

The present invention relates to a portable terminal, and more particularly to the portable terminal in which more than a pair of housings are pivotally coupled to each other and circuit devices installed in each of the housings are communicatively interconnected to each other.

2. Description of the Related Art

As generally known in the art, the portable terminal is a device providing wireless communication function between users or between the user and a service provider via a mobile base station. Using the portable terminal, the user is provided with various kinds of service contents, such as voice communication, message transmission, mobile banking, television broadcasting, online game, VOD (video on demand), etc.

The portable terminal may be classified into the following categories depending on its exterior shape: a bar type terminal including a one-piece housing installed with a communication circuit and an input/output device, such as a transmitting portion and a receiving portion; a flip type terminal including a flip cover installed to the bar type terminal; a folder type terminal including a pair of housings, which may be pivotally opened/closed and in each of which the input and the output devices are respectively disposed. Recently, a sliding type terminal and a swing type terminal have appeared on the market and increased portability and convenience in use.

Amongst all the phones, the user tends to prefer the terminal including two or more housings connected to each other, such as the folder type terminal, the sliding type terminal and the swing type terminal. It is because the housings can be folded to each other which enables the user to carry around more conveniently. Also, it is because one of the housings can be unfolded or extended from the other to make the terminal operated more conveniently while in use.

In the terminal having a plurality of the housings as described before, a flexible printed circuit is used for establishing communication lines between circuit devices installed in each of the housings. Here, repeated opening/closing operations of the housings increase fatigue of the flexible printed circuit, so that there is a risk that circuit patterns formed thereon may be damaged. Further, in information transmission mode requiring a larger capacity, such as multimedia service, there is a problem in that the flexible printed circuit is not adequate for such transmission requiring a higher speed and larger capacity.

As an alternative to solve the above-stated problems in the flexible printed circuit, a number of proposals are provided in that a plurality of flexible circuits are overlapped to couple the circuit devices in the terminal housings to establish the communication lines for a higher speed and larger capacity. However, if a number of flexible printed circuits are overlapped to each other, there is another problem in that the terminal cannot be smoothly operated due to degradation of the flexibility or there is enhanced risk of damaging the flexible printed circuit further.

Accordingly, there is a need for an improved portable terminal to solve the above-mentioned problems.

SUMMARY OF THE INVENTION

The present invention provides a portable terminal with an optical transmitter/receiver, which enables it to stably maintain the communication state of circuit devices installed in each of terminal housings in spite of the repeated opening/closing operations of the terminal housings.

The present invention also provides a portable terminal with an optical transmitter/receiver, which may maintain the communicational coupling capable of transmitting information with a higher speed and larger capacity between the circuit devices installed in each of the terminal housings.

In accordance with an aspect of the present invention, there is provided a portable terminal including: a first housing; a second housing, which is coupled to the first housing and can be folded on or unfolded from the first housing by pivoting on a predetermined hinge axis; a first optical transmitter mounted to the first housing; and a first optical receiver mounted to the second housing and facing the first optical receiver, wherein optical axes of the first optical transmitter and the first optical receiver are aligned with the hinge axis.

In accordance with another aspect of the present invention, there is provided a portable terminal including: a first housing; a second housing coupled to one side of the first housing pivotally about a hinge axis extending perpendicularly to one side of the first housing; a first optical transmitter mounted to the first housing; and a first optical receiver mounted to the second housing and facing the first optical receiver, wherein optical axes of the first optical transmitter and the first optical receiver are aligned with the hinge axis.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE EXEMPLARY EMBODIMENT

Figure 1:
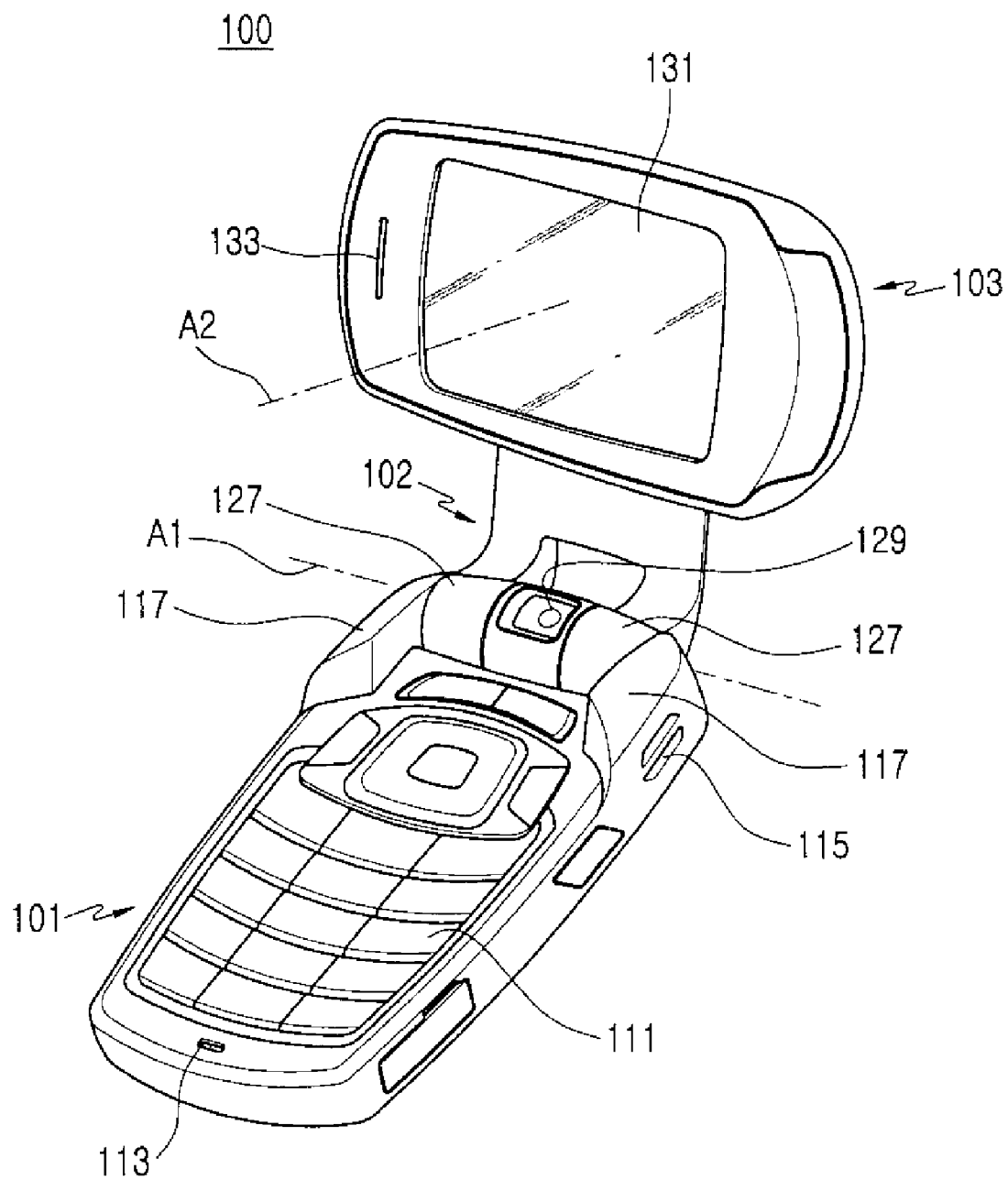
FIG. 1 is a perspective view of a portable terminal including an optical transmitter/receiver according to a exemplary embodiment of the present invention.

Hereinafter, exemplary embodiments of the present invention will be described with reference to the accompanying drawings. In the following description, the same elements will be designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. For the purposes of clarity and simplicity, a detailed description of known functions and configurations incorporated herein will be omitted as it may make the subject matter of the present invention unclear.

Figure 2:
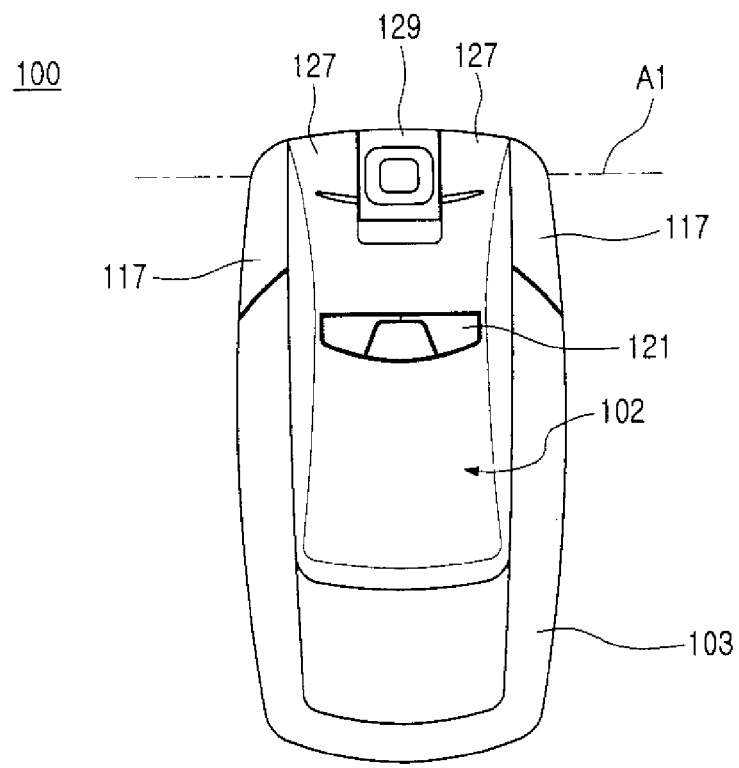
FIG. 2 is a front view of the portable terminal of FIG. 2 illustrating how a second housing and a third housing are folded to a first housing.
Figure 3:
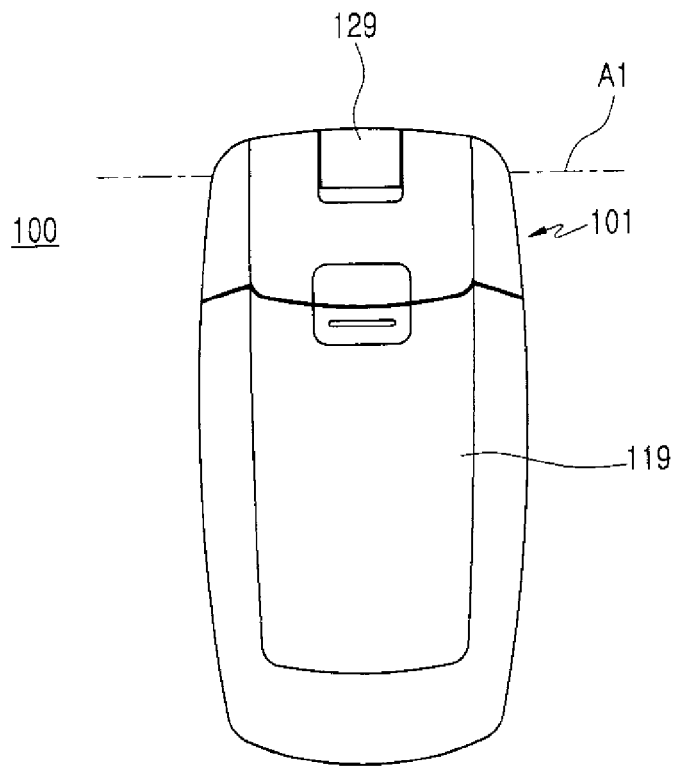
FIG. 3 is a rear view of the portable terminal of FIG. 2.

As illustrated in FIGS. 1 to 3, a terminal 100 according to a exemplary embodiment of the present invention includes a first housing 101 and a second housing 102, which pivots around a hinge axis A1 to come close to or move away from the first housing 101.

Also, while a conventional folder type terminal has a display and a receiver on the second housing 101, the portable terminal 100 of the present embodiment has a third housing 103 coupled to the second housing 102, wherein the third housing 103 includes a display device 131 and a receiver 133 disposed thereon. The third housing 103 may pivot about a second hinge axis A2 extending perpendicular to the first axis A1. As the second housing 102 pivots on the first hinge axis A1, the second axis A2 swings around the first axis A1.

A keypad 111 and a transmitter 113 are disposed atone side of the first housing 101, and a battery pack 119 is disposed at the other side of the first housing 101. Side hinge arms 117 are formed to face to each other at opposite sides of an upper end. Depending on a product model type, speaker devices 115 can be installed at either side of the first housing 101. The speaker devices 115 are installed adjacent to the side hinge arms 117.

The second housing 102 includes a center hinge arm 127 installed at an end thereof. The center hinge arm 127 is pivotally coupled between the side hinge arms 117. The first hinge axis A1 is formed with the center hinge arm 127 pivotally coupled between side hinge arms 117, so that the center hinge arm 127 pivots on the first hinge axis A1. Thus, the second housing 102 is pivotally coupled to the first housing 101 on the first hinge axis A1. As a result, with the pivotal movement on the first hinge axis 102, the second housing 102 is folded or unfolded with respect to the first housing 101.

The second housing 102 serves as a connection member for coupling the third housing 103 to the first housing 101 and may include a keypad 121 with two or three keys on an outer surface thereof. The keypad 121 on the outer surface of the second housing 102 is designated to be used for searching, selecting and playing/stopping multimedia file. Although not illustrated in the drawings, a small-sized display may be disposed on the outer surface of the second housing 102 so as to display short information, such as time, transmitting/receiving signal state, remaining amount of a battery and etc. In a middle portion of the center hinge arm 127, a hole may be formed for mounting a camera unit 129.

The third housing 103 is oppositely coupled to the second housing 102 to pivot on the second hinge axis A2. Another speaker device 133 may be disposed on at least one side of the display device 131 installed on an inner surface of the third housing 103.

The speaker device 133 on the third housing 103 may be disposed on either side of the display device 131 depending on the product model type. When the third housing 103 pivots on the second hinge axis A2 in an open state of the second housing 102, the display device 131 is so arranged that, from the viewpoint of a user, a horizontal length thereof is larger than a vertical length thereof and each of the speaker devices is disposed on either side of the display device 131. Here, at least one of the speaker devices should serve as the receiver when in voice communication.

In the present embodiment however, since the speaker devices 115 are disposed on either side of the first housing 101, respectively, the speaker device 133 on the third housing 103 is provided as a single unit and serves as the receiver.

In a folded state of the second housing 102 onto the first housing 101, the third housing 103 is interposed between the first housing 101 and the second housing 102, and the display 131 faces a surface of the first housing 101. Accordingly, in the folded state of the second housing 102 onto the first housing 101, the display device 131 is closed, whereas in an unfolded state of the second housing 102, the display device 131 is opened.

On the other hand, in an open state (i.e., an unfolded state) of the second housing 102, the third housing 103 pivots on the second hinge axis A2 to place the display device 131 in a horizontally extended position, so that the user may conveniently view an image of T.V. or moving picture file through the display device 131.

In the exemplary embodiment of the present invention, the portable terminal 100 includes an optical transmitter/receiver for coupling circuit devices respectively housed in the first, second and third housings 101, 102 and 103 to each other so as to maintain communication state there-between.

As described herein below, the optical transmitter represents an optical device for converting an electrical signal to an optical signal in order to transmit the optical signal and includes a laser diode as an example. On the other hand, the optical receiver represents an optical device for converting the optical signal to the electrical signal in order to receive the optical signal and includes a photodiode as an example.

Figure 4:
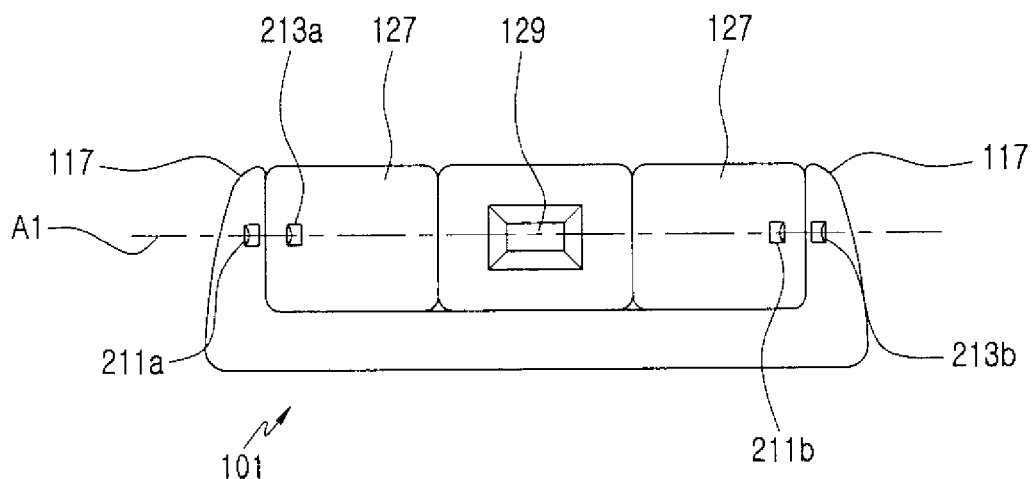
FIG. 4 is a structural view of a first embodiment wherein an optical transmitter/receiver is disposed between the first housing and the second housing of the portable terminal as shown in FIG. 1.
Figure 5:
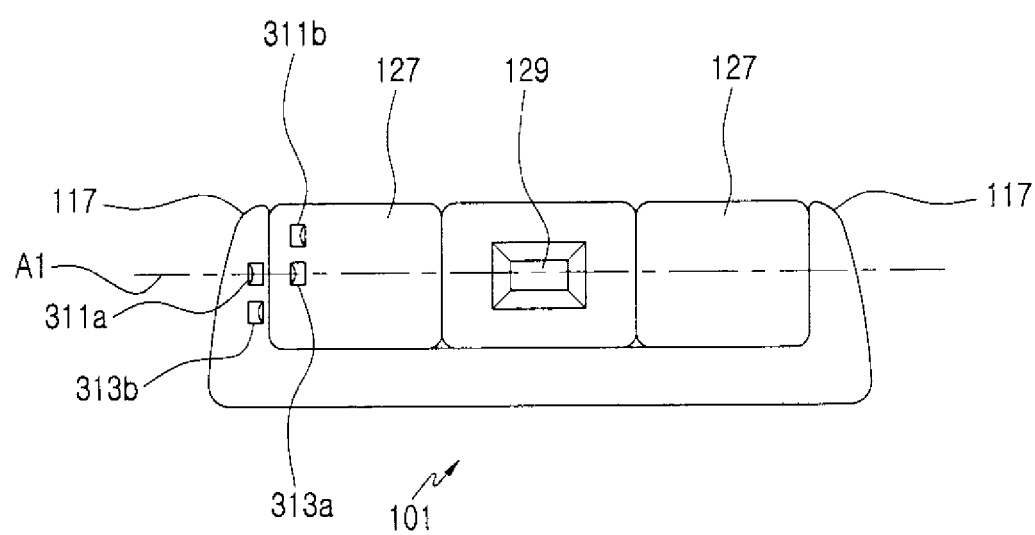
FIG. 5 is a structural view of a second embodiment wherein the optical transmitter/receiver is disposed between the first housing and the second housing of the portable terminal as shown in FIG. 1.

FIGS. 4 and 5 illustrate an example of the optical transmitter/receiver for coupling the circuit devices in the first and the second housings 101 and 102. FIGS. 6 to 11 illustrate another example of the optical transmitter/receiver for coupling the circuit devices in the second and the third housings 102, 103.

Referring to FIG. 4, the optical transmitter/receiver includes a first and a second optical transmitter 211a, 211b and a first and a second optical receiver 213a, 213b. The first and the second optical transmitters 211a, 211b and the first and second optical receivers 213a, 213b are arranged along the first hinge axis A1, and each of their optical axes is aligned with the hinge axis A1.

The first optical transmitter 211a is mounted on one side of the side hinge arm 117 and converts the electrical signal generated from the circuit devices in the first housing 1 to an optical signal for a subsequent transmission. The first optical receiver 213a is mounted on an end of the center hinge arm 127 to face the first optical transmitter 211a. The first optical receiver 213a receives the optical signal from the first optical transmitter 211a and converts the optical signal to an electrical signal, which in turn is provided to the circuit devices in the second housing 102.

The second optical transmitter 211b is mounted on the other end of the center hinge arm 127 and converts the electrical signal generated from the circuits in the second housing 102 to an optical signal for a subsequent transmission. The second optical receiver 213b is mounted on the other side of the side hinge arm 117 to face the second optical transmitter 211b. The second optical receiver 213b receives the optical signal from the second optical transmitter 211b and converts the optical signal to an electrical signal, which in turn is provided to the circuit devices in the first housing 101.

Note that if the terminal 100 is a conventional folder-type terminal and that only an output device, such a display device and a receiver is installed on the second housing 102, it needs not include the second optical transmitter 211b and second optical receiver 213b.

Although not illustrated, in order to supply an electric current to the circuit devices installed in the second housing 102, the terminal 100 may include a flexible printed circuit. The flexible printed circuit extends from the first housing 101 to the second housing 102 through either one of the side hinge arms 117 and the center hinge arm 127. Further, data that do not require high-speed transmission, such as numbers or letters inputted by operation of the keypads 111, may be transmitted through the flexible printed circuit. In other words, it is preferable to use the optical transmitter/receiver for transmission of data such as moving picture file, which requires large capacity and high-speed transmission.

FIG. 5 illustrates another embodiment of the optical transmitter/receiver which may be installed between the first and second housings 101, 102. In the description for the embodiment of FIG. 5, main structures of a first optical transmitter 311a and a second optical receiver 313b are similar to those described with reference to FIG. 4. Thus, a detailed description thereof will be omitted herein to avoid redundancy.

Referring to FIG. 5, the optical transmitter/receiver includes the first optical transmitter 311a, the first optical receiver 313a, a second optical transmitter 311b, and a second optical receiver 313b. The second optical transmitter 311b is installed at one end of the center hinge arm 127 and located adjacent to the first optical receiver 313a, and the second optical receiver 313b is installed on one side of the side hinge arm 117 and located adjacent to the first optical transmitter 311a.

Since the first optical transmitter 311b is not aligned with the second optical receiver 313b along an optical axis in a state that the second housing 102 and the first housing 101 are folded to each other, the signal generated from the circuit devices in the second housing 102 cannot be transmitted to the first housing 101. While the second housing 102 pivots away from the first housing 101, the second transmitter 311b pivots on the first hinge axis A1, specifically around the first optical receiver 313b. When the second housing 102 is unfolded from the first housing 101 and then stops pivoting away from the first housing 101, the optical axis of the second optical transmitter 311b is aligned with the optical axis of the second optical receiver 313b.

In the embodiment illustrated in FIG. 5, the first optical transmitter 311a always maintains the optical alignment with the first optical receiver 313a, while the second optical transmitter 311b comes to be aligned with the second optical receiver 313b only when the second housing 102 is unfolded from the first housing 101. Accordingly, the electrical signal generated from the circuit device in the second housing 102 can be transmitted to the circuit device in the first housing 101 only when the second housing 102 is unfolded.

In the embodiment illustrated in FIG. 5, when the second optical transmitter 311b is aligned with the second optical receiver 313b, the optical axis of the alignment is arranged to extend in parallel to the first hinge axis A1 with a distance there-between. On the other hand, when the second housing 102 is unfolded and then stops pivoting, the second optical transmitter 311b comes to be aligned with the second optical receiver 313b. Here, it should be appreciated that the optical axis of the alignment is not necessarily parallel to the first hinge axis A1.

Figure 6:
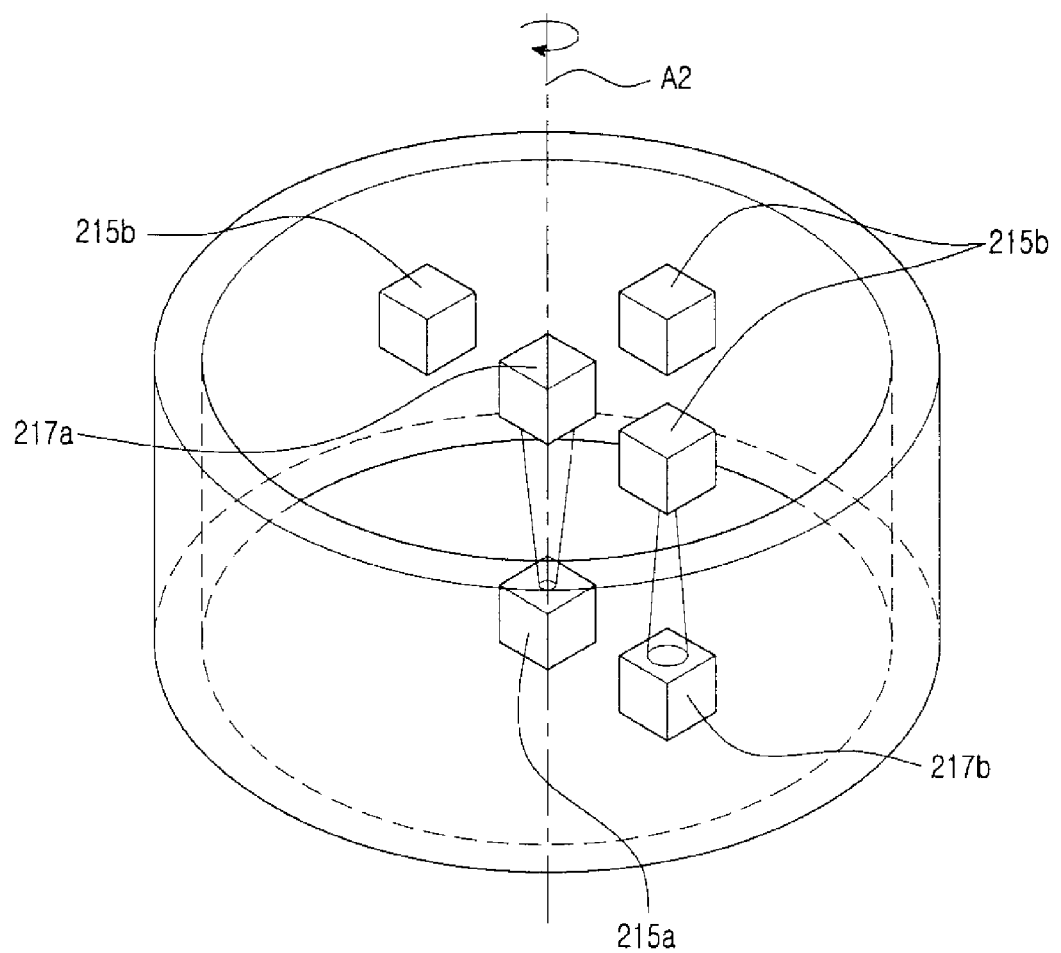
FIG. 6 is a structural view of a first embodiment wherein the optical transmitter/receiver is disposed between the second housing and the third housing of the portable terminal as shown in FIG. 1.
Figure 7:
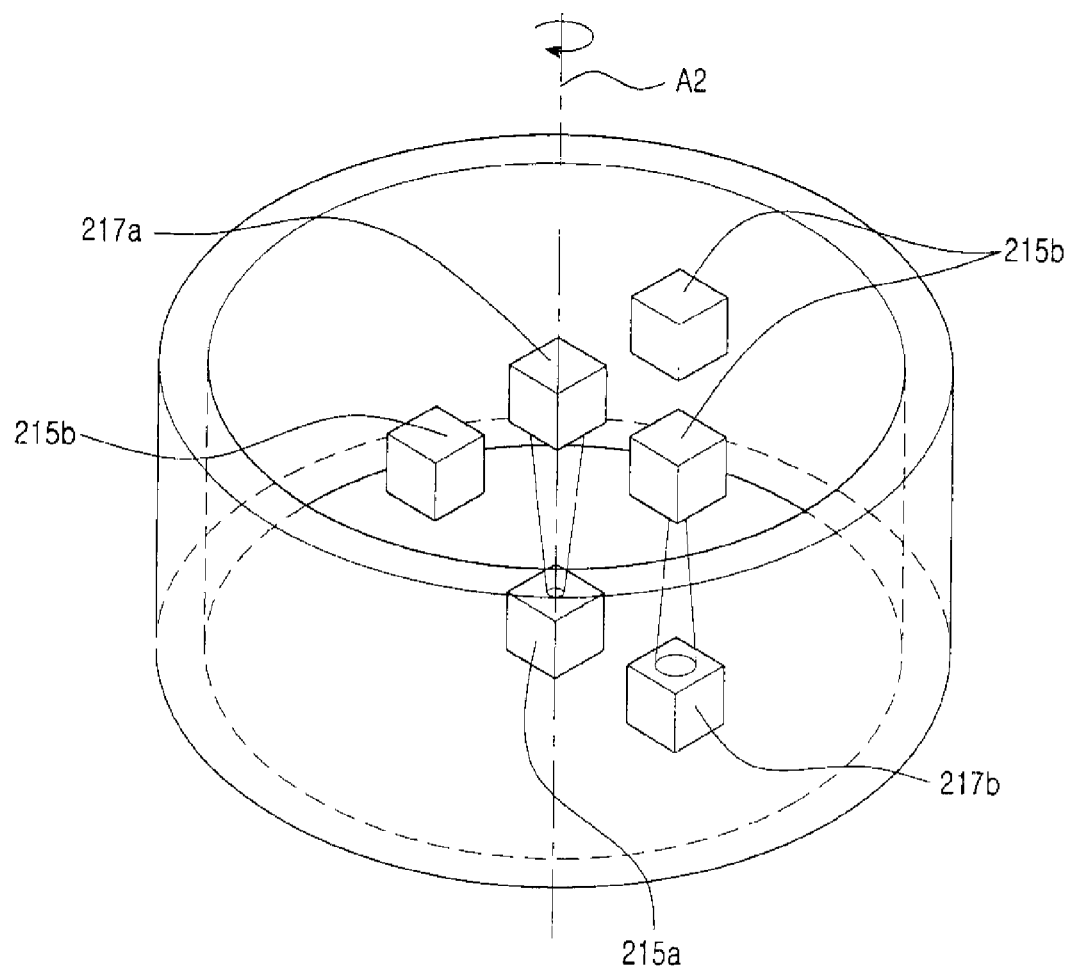
FIGS. 7 and 8 are structural views illustrating operation of the optical transmitter/receiver as shown in FIG. 6.
Figure 8:
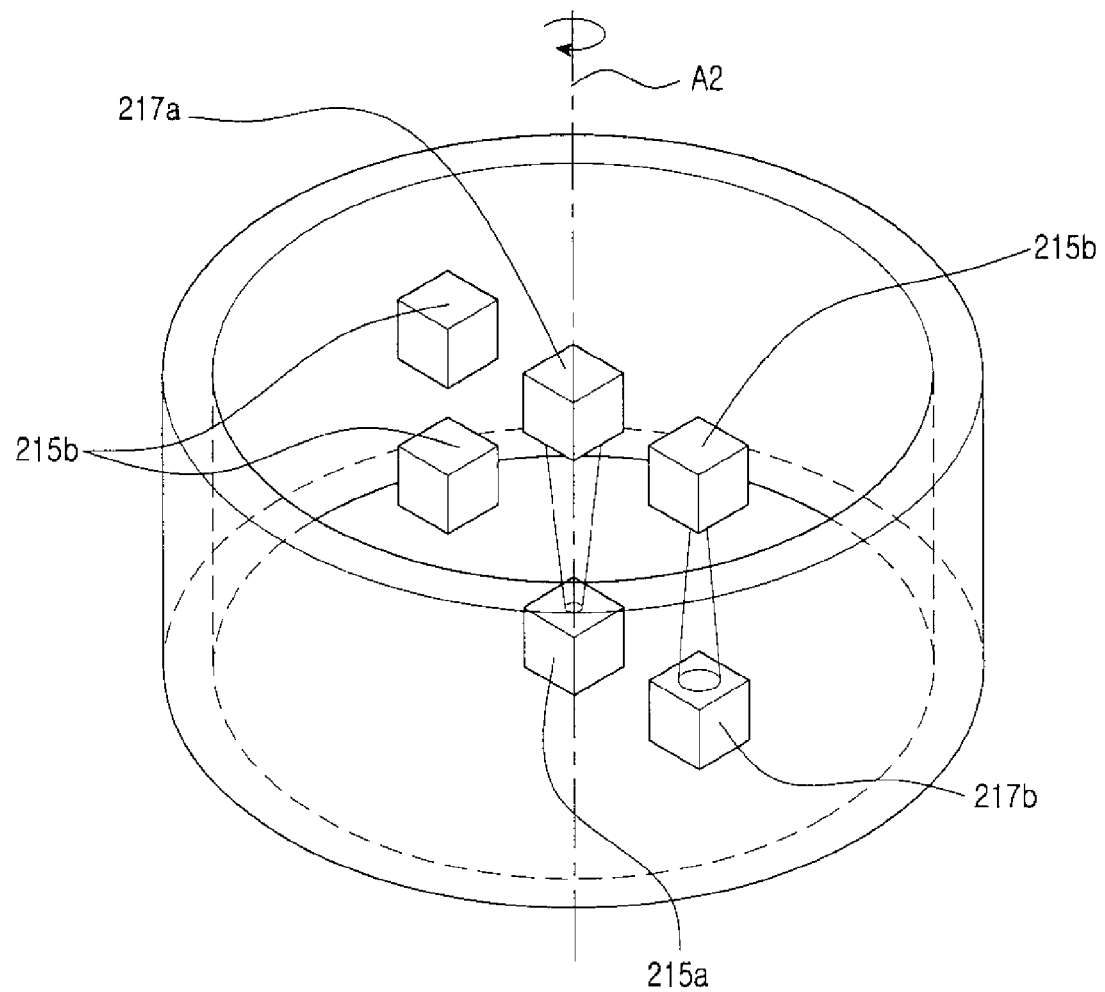

FIGS. 6 to 8 illustrate another embodiment of the optical transmitter/receiver capable of being installed between the second housing 102 and the third housing 103. The second housing 102 and the third housing 103 are oppositely and pivotally coupled to each other by means of a hinge mechanism (not shown). In a state that the second housing 102 is unfolded from the first housing 101, the display device 131 is positioned in a vertical direction. After the third housing 103 turns with an angle of 90° about the second hinge axis A2, the display device 131 is positioned in a horizontal direction as illustrated in FIG. 1. Although the embodiment of the present invention only describes an example of the third housing 103 turning with the angle of 90°, one of ordinary skill in the art may appreciate that the third housing 103 may be configured to turn with such an angle as 180°, 270° or 360°.

Referring to FIGS. 6 to 8, the optical transmitter/receiver installed between the first housing 102 and the third housing 103 includes a third optical transmitter 215a mounted to the second housing 102 and arranged on the second hinge axis A2; and a third optical receiver 217a mounted to the third housing 103 and arranged on the second hinge axis A2. The third optical receiver 217a is oppositely and optically aligned with the third optical transmitter 215a. The third optical transmitter 215a converts the electrical signal generated from the circuit device in the second housing 102 or data delivered from the first housing 101 to the optical signal to thereby transmit the optical signal, whereas the third optical receiver 217a receives the optical signal from the third optical transmitter 217a and converts the optical signal to the electrical signal for providing the electrical signal to the circuit device in the third housing 103. As stated herein above, a display device 131 and a receiver 133 are included on the third housing 103. The circuit device in the third housing 103 drives the display device 131 and the receiver 133.

On the other hand, there may be included another type of input device on the third housing 103, or a fourth optical receiver 217b and a fourth optical transmitter 215b between the second housing 102 and the third housing 103 in order to transmit the data processed by the circuit device in the third housing 103 to the circuit devices in the first housing 101 or the second housing 102. As mentioned herein before, however, if the third housing 103 includes only the output devices and does not need to transmit the data processed by the circuit device in the third housing 103 to the circuit device in the first housing 102 or the second housing 103, it is not necessary to install the fourth optical receiver 217b and the fourth optical transmitter 215b.

The fourth optical receiver 217b is mounted to the second housing 102 and arranged adjacent to the third optical transmitter 215a. The fourth optical receiver 217b is optically aligned to any one of the fourth optical transmitters 215b mounted on the third housing 103. The fourth optical receiver 217b receives the data processed by the circuit device in the third housing 103 and transmits the data to the circuit device in the second housing 102 or the first housing 101.

In the present embodiment, there are three of the fourth optical transmitters 215b arranged with an angular interval of 90° along a pivotal path centering about the first optical receiver 217a. The number of the fourth optical transmitters 215b may be changed depending on the number of stop positions at which the user stops the pivotal movement of the third housing 103.

FIG. 6 illustrates a configuration of the optical transmitter/receiver ranging from a state in which the second and the third housings 102,103 are folded to the first housing 101 to the other state in which the second housing 102 is unfolded from the first housing 101. Here, while the third optical transmitter 215a is optically aligned to the third optical receiver 217a, one of the fourth optical transmitters 215b, which is located at a first position in a circumferential direction, is optically aligned to the fourth receiver 217b. Accordingly, the terminal 100 may be used in the same way as the conventional folder type terminal.

FIG. 7 illustrates a configuration of the optical transmitter/receiver, wherein the third housing 103 pivots with the angle of 90° about the second housing 102 to make the display device 131 located at a horizontal position. In other words, as illustrated in FIG. 1, when the second housing 102 is unfolded from the first housing 101 and then the third housing 103 pivots with the angle of 90°, the fourth optical transmitters 215b rotates about the third optical receiver 217a so that the second of the fourth optical transmitters 215b, which is located at a second position in the circumferential direction, is optically aligned with the fourth optical receiver 217b.

Since both function modes of the terminal 100, in other words, a communication mode and a broadcast-viewing mode are available only by the pivotal movement of the third housing 103 with the angle of 90°, it may be enough to include only two of the fourth optical transmitters 215b. In the optical transmitter/receiver illustrated in FIGS. 7 and 8, a configuration including three of the fourth optical transmitters 215b intends to present that the third housing 103 pivots on the second hinge axis A2 with the angle of with 180° and that the different operation modes may be set at every stop position angularly spaced with the angle of 90°.

An image presented by the display device 131 when the third of the fourth optical transmitters 215b faces the third optical receiver 217b corresponds to the one that is formed by rotating an image, which is displayed when the third one of fourth optical transmitters 215b faces the fourth optical receiver 217b, about the second hinge axis A2 with the angle of 180°.

On the other hand, in the configuration of the optical transmitter/receiver illustrated in FIGS. 6 to 8, although the optical axes of the fourth optical receiver 217b and the fourth optical transmitters 215b are arranged in parallel to the second hinge axis A2 with a distance there-between, it does not have to arrange the optical axes of the fourth optical receiver 217b and the fourth optical transmitter 215b in parallel to the second hinge axis A2. In other words, if the second of the fourth optical transmitters 215b is installed to be optically aligned with the fourth optical receiver 217b when the second housing 103 pivots with the angle of 90° from a state in which the first one of the fourth optical transmitters 215b is optically aligned with the fourth optical receiver 217b, the optical axes of the fourth optical receiver 217b and the fourth optical transmitter 215b do not have to be in parallel to the second hinge axis A2.

Figure 9:
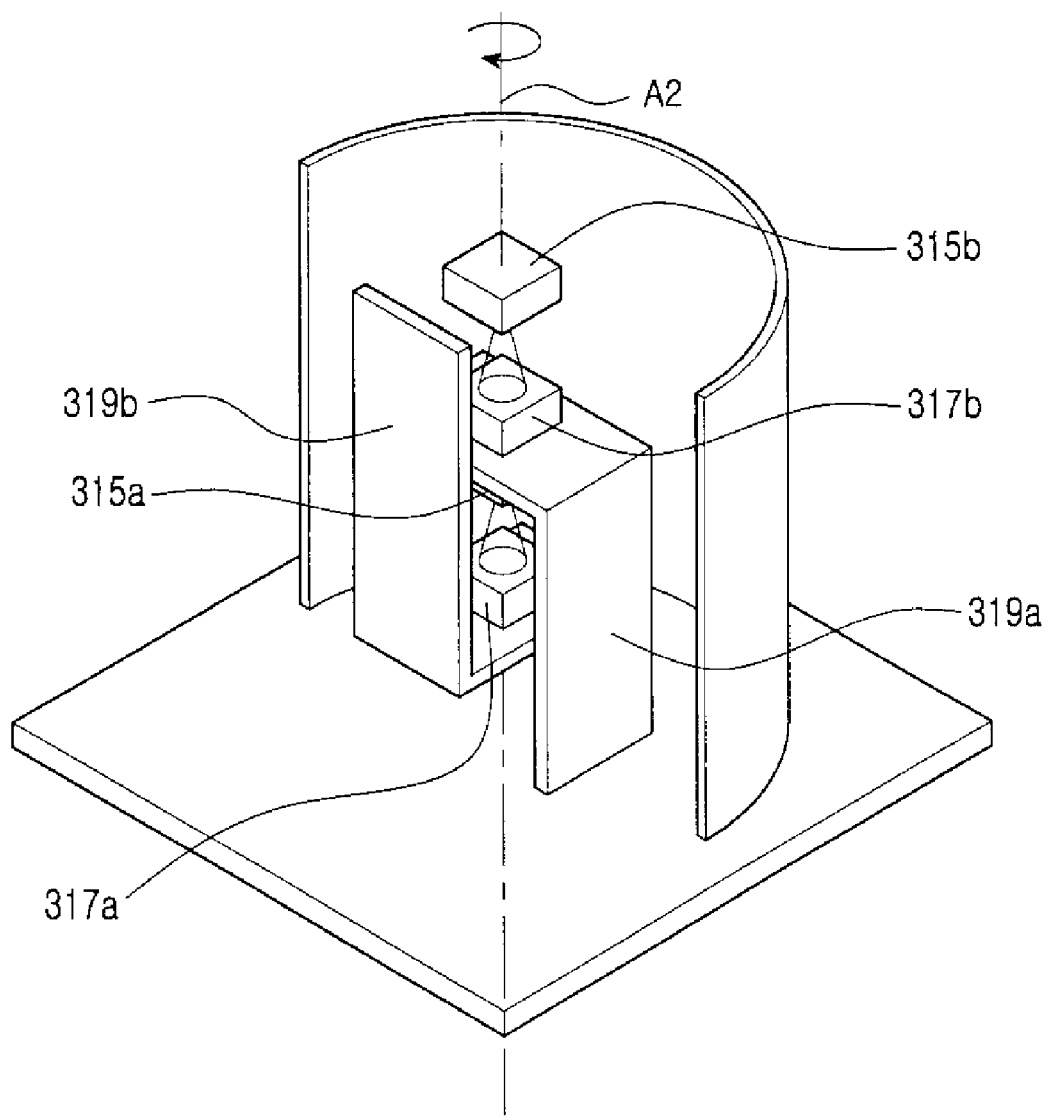
FIG. 9 is a structural view of a second embodiment wherein the optical transmitter/receiver is disposed between the second housing and the third housing of the portable terminal as shown in FIG. 1.
Figure 10:
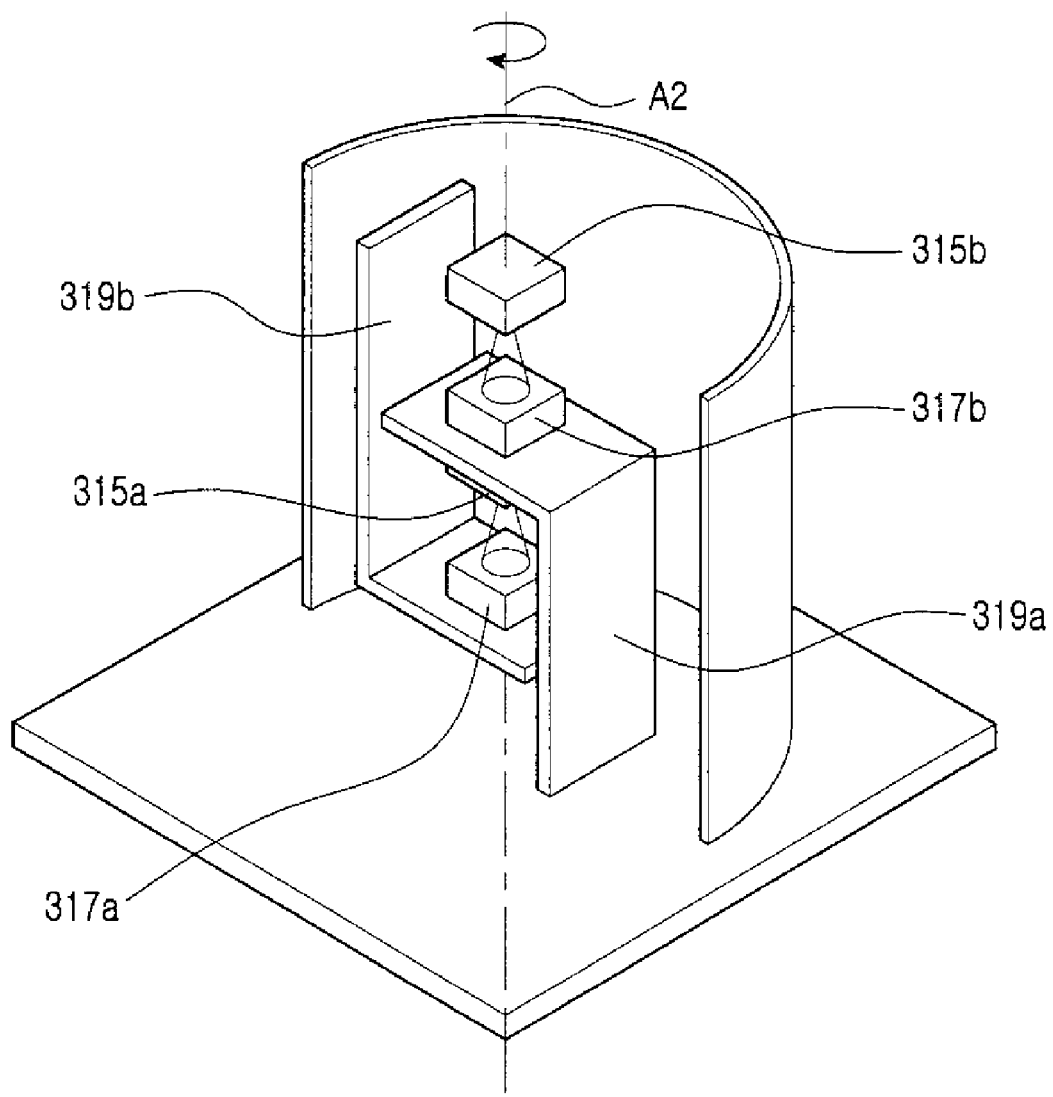
FIGS. 10 and 11 are structural views illustrating operation of the optical transmitter/receiver as shown in FIG. 9.
Figure 11:
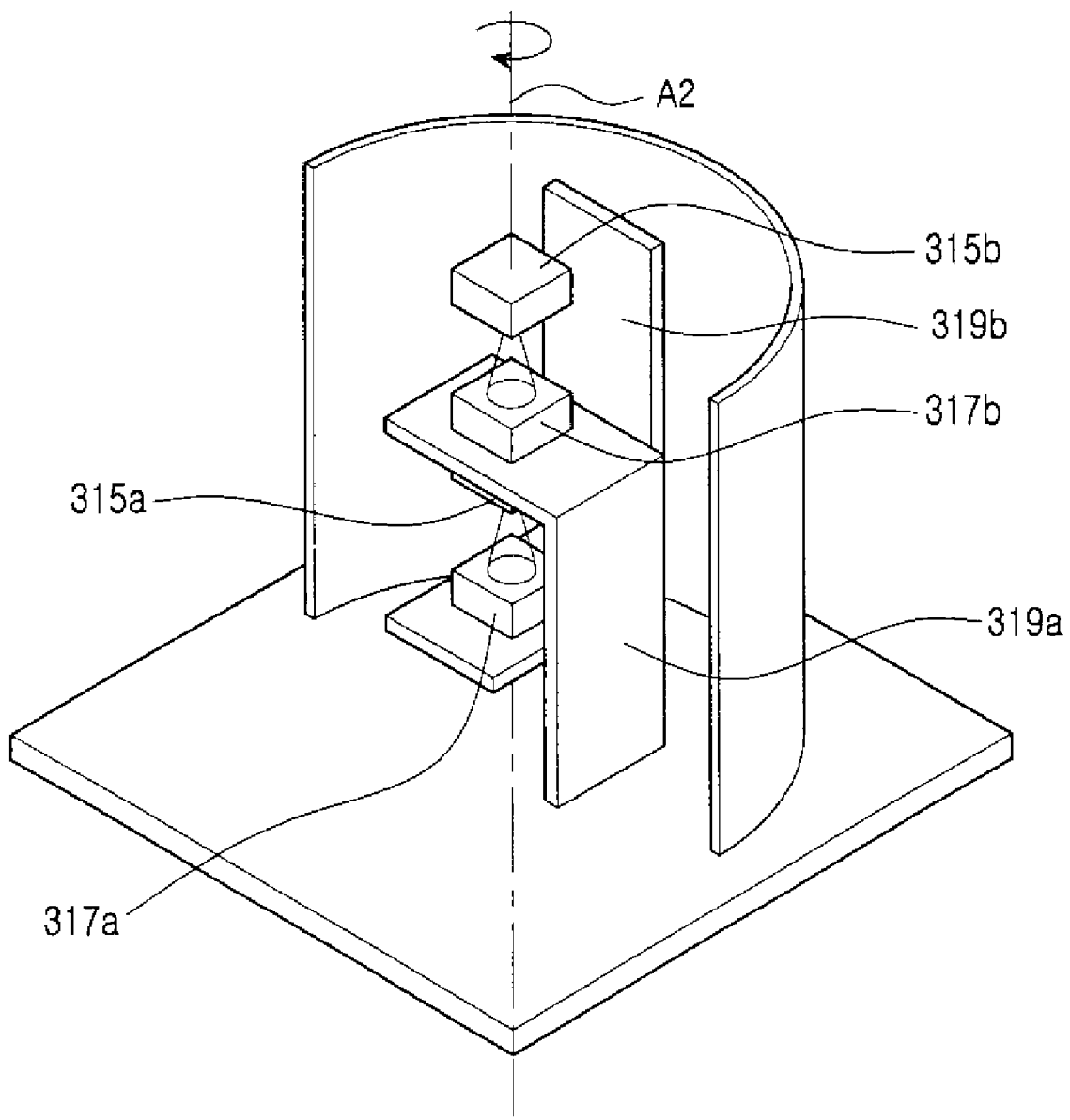

FIGS. 9 to 11 illustrates a configuration of an optical transmitter/receiver between the second housing 102 and the third housing 103, wherein the optical axes of a third optical transmitter 315a, a third optical receiver 317a, a fourth optical transmitter 315b and a fourth optical receiver 317b are arranged to be linearly aligned with the second hinge axis A2.

Here, the optical transmitter/receiver includes, along a direction of the hinge axis A2, the third optical receiver 317a, the third optical transmitter 315a, the fourth optical receiver 317b, and the fourth optical transmitter 315b in order. Further, the third optical transmitter 315a and the fourth optical receiver 317b are arranged on either side of a flexible printed circuit 319a which is extended from the second housing 102 to thereby be fixed to the second housing 102, and the third optical receiver 317a is fixed to the third housing 103 via another flexible printed circuit 319b to thereby pivot on the second hinge axis A2 when the third housing 103 pivots. The fourth optical transmitter 315b may be directly coupled to the circuit device in the third housing 103 and may be coupled to the circuit device in the second housing 102 via a separate flexible printed circuit in the same way as the third optical receiver 317a.

The flexible printed circuit 319b coupling the third optical receiver 317b to the circuit device in the third housing 103 pivots on the second hinge axis A2 as the third housing 103 pivots. The third optical transmitter 315a, the third optical receiver 317a, the fourth optical transmitter 315b, and the fourth optical receiver 317b always maintain an inter-coupled state irrespective of the pivotal movement of the third housing 103.

The operation of the third optical transmitter 315a, the third optical receiver 317a, the fourth optical transmitter 315b, and the fourth optical receiver 317b may be readily appreciated by the configuration described with reference to FIGS. 6 to 8. Accordingly, a more detailed description thereto will be omitted herein to avoid redundancy. Meanwhile, the third optical transmitter 315a, the third optical receiver 317a, the fourth optical transmitter 315b, and the fourth optical receiver 317b are arranged along the second hinge axis A2 to thereby make each optical axis thereof aligned with the second hinge axis A2. Thus it is always possible for the second housing 102 and third housing 103 to maintain bi-directional communication. Also, it is possible to reduce the number of the fourth optical transmitters as compared to the configuration described with reference to FIGS. 6 to 8.

As describe herein above, with use of the optical transmitter/receiver for maintaining the communication lines between the circuit devices in the housings, the portable terminal according to the present invention has an advantage in that information transmission with a higher speed and larger capacity is available than through the communication lines using a flexible printed circuit. Further, since the communication lines are optically coupled between the circuit devices in the housings of the terminal, a stable communication state may be maintained irrespective of the repeated opening-closing operations of the housings.

Moreover, since it is not necessary to have a number of flexible printed circuits overlapped for transmitting information with higher speed and larger capacity, the present invention has another advantage in that a smoother opening-closing operation of the housings is possible in addition to information transmission with higher speed and larger capacity. In other words, if the flexible printed circuits are overlapped for the purpose of transmitting information with higher speed and larger capacity, a smooth opening-closing operation of the housings is not available due to resiliency of the overlapped flexible printed circuits in the prior art. However, in the present invention, the optical transmitter/receiver makes it possible to transmit the information with higher speed and lager capacity.

Although the detailed description of the present invention has been described with reference to the specific embodiments hitherto, it will be apparent to one of ordinary skill in the art that many kinds of variants are available within the scope of the present invention. For instance, although the specific embodiment of the present invention describes the terminal 100 in which the first housing 101 and the second housing 102 are coupled to each other as in the folder-type terminal and in which the third housing 103 is rotatably and oppositely coupled to the second housing 102, the optical transmitters/receivers illustrated in FIGS. 6 to 8 and 9 to 11 may be employed in any type of a terminal in which a pair of housings are face-to-face coupled to each other and in which one of the housings pivots on a pivot axis perpendicularly extending at a side of the other housing.

Further, as mentioned herein before, the separate flexible printed circuit may be used for transmitting low speed-small capacity data and for supplying electric power to the second housing 102. Similarly, it is evident that a separate flexible printed circuit may be used for transmitting the low speed-small capacity data and for supplying the electric power between the second housing 102 and the third housing 103.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A portable terminal comprising:
    a first housing;
    a second housing rotatably coupled to the first housing to be folded or unfolded relative to the first housing by pivoting on a predetermined first hinge axis;
    a first optical transmitter mounted to the first housing; and
    a first optical receiver mounted to the second housing and facing the first optical receiver,
    a third housing that pivots about a second hinge axis that extends perpendicular to the predetermined first hinge axis,
    wherein optical axes of the first optical transmitter and the first optical receiver are aligned with the predetermined first hinge axis.

2. The portable terminal as claimed in claim 1, further comprising:
    a pair of side hinge arms oppositely formed at an end of the first housing; and
    a center hinge arm formed at an end of the second housing to be pivotally coupled between the side hinge arms and pivoting on the predetermined hinge axis,
    wherein the first optical transmitter is mounted to one of the side hinge arms and the first optical receiver is mounted to an end of the center hinge arm.

3. The portable terminal as claimed in claim 2, further comprising:
    a second optical receiver mounted to the other one of the side hinge arms; and
    a second optical transmitter mounted to the other end of the center hinge arm to face the second optical receiver,
    a third optical transmitter and a third optical receiver installed between the first housing and the third housing, and
    a fourth optical receiver and a fourth optical transmitter arranged between the second housing and the third housing transmitting data processed by a circuit device in the third housing to circuit devices processed in the first housing or the second housing,
    wherein optical axes of the optical transmitter, and the optical receiver are aligned with the predetermined hinge axis.

4. The portable terminal as claimed in claim 2, further comprising:
    a second optical receiver mounted to one of the side hinge arms to be located adjacent to the first optical transmitter; and
    a second optical transmitter mounted to one end of the center hinge arm to be located adjacent to the first optical receiver,
    wherein the second optical transmitter faces the second optical receiver and at the same time optical axes of the second optical transmitter and the second optical receiver are arranged in parallel to the predetermined hinge axis with a distance there-between when the second housing is unfolded from the first housing.

5. The portable terminal as claimed in claim 2, further comprising a flexible printed circuit extending from the first housing to the second housing via one of the side hinge arms and via center hinge arm,
    wherein the flexible printed circuit supplies data and electric power from the first housing to the second housing.

6. A portable terminal comprising:
    a first housing;
    a second housing coupled to one side of the first housing pivotally about a predetermined hinge axis extending perpendicularly to one side of the first housing;
    a first optical transmitter mounted to the first housing; and
    a first optical receiver mounted to the second housing and facing the first optical receiver,
    wherein optical axes of the first optical transmitter and the first optical receiver are aligned with the predetermined hinge
    further comprising:
    a second optical receiver mounted to the first housing; and
    a second optical transmitter mounted to the second housing and facing the second optical receiver,
    wherein optical axes of the second optical receiver and the second optical transmitter are aligned with the predetermined hinge axis only when the first housing and second housing of the portable terminal are in an unfolded position.

7. The portable terminal as claimed in claim 6, wherein:
    the first optical receiver, the first optical transmitter, the second optical receiver and the second optical transmitter are arranged in order along the predetermined hinge axis; and
    the first optical transmitter and the second optical receiver are mounted on either side of flexible printed circuit extending from the first housing.

8. A portable terminal comprising:
    a first housing;
    a second housing coupled to one side of the first housing pivotally about a predetermined hinge axis extending perpendicularly to one side of the first housing;
    a first optical transmitter mounted to the first housing; and
    a first optical receiver mounted to the second housing and facing the first optical receiver,
    wherein optical axes of the first optical transmitter and the first optical receiver are aligned with the predetermined hinge axis, and further comprising:
    a second optical receiver coupled to a first housing to be located adjacent to the first optical transmitter; and
    at least one pair of second optical transmitters mounted to the second housing and rotated about the first optical receiver according to a pivotal movement of the second housing,
    wherein the second optical receiver faces a selected one of the second optical transmitters according to the pivotal movement of the second housing.

9. The portable terminal as claimed in claim 8, wherein the portable terminal comprises three second optical transmitters, which are arranged with an angular interval of 90° along a pivotal path centering about the first optical receiver.

10. The portable terminal as claimed in claim 8, wherein the optical axes of the optical receiver and the optical transmitter are arranged in parallel to the predetermined hinge axis while being spaced from each other when the second optical receiver faces one of the second optical transmitters for optical alignment.

* * * * *

UNITED STATES PATENT AND TRADEMARK OFFICE
CERTIFICATE OF CORRECTION

| | | |
|---|---|---|
| PATENT NO. | : 8,060,030 B2 | Page 1 of 1 |
| APPLICATION NO. | : 12/013593 | |
| DATED | : November 15, 2011 | |
| INVENTOR(S) | : Do-Young Rhee et al. | |

It is certified that error appears in the above-identified patent and that said Letters Patent is hereby corrected as shown below:

Column 9, Claim 3, Lines 59-60 should read as follows:
-- ...and the third housing configured for transmitting data... --

Signed and Sealed this
Tenth Day of July, 2012

David J. Kappos
*Director of the United States Patent and Trademark Office*